United States Patent
Colacito et al.

(10) Patent No.: US 9,463,689 B2
(45) Date of Patent: Oct. 11, 2016

(54) HYDRAULIC MOTOR INTEGRATED IN A VEHICULAR WHEEL

(71) Applicant: FPT Industrial S.p.A., Turin (IT)

(72) Inventors: Emanuele Colacito, Pescara (IT); Edoardo Curti, Chieri (IT); Massimo Melluso, Turin (IT); Giorgio Rossia, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 14/761,874

(22) PCT Filed: Jan. 30, 2014

(86) PCT No.: PCT/EP2014/051786
§ 371 (c)(1),
(2) Date: Jul. 17, 2015

(87) PCT Pub. No.: WO2014/118270
PCT Pub. Date: Aug. 7, 2014

(65) Prior Publication Data
US 2015/0336454 A1 Nov. 26, 2015

(30) Foreign Application Priority Data
Jan. 30, 2013 (EP) ..................................... 13153240

(51) Int. Cl.
*B60K 7/00* (2006.01)
*B60K 17/10* (2006.01)
*F04B 1/04* (2006.01)

(52) U.S. Cl.
CPC ............ *B60K 7/0015* (2013.01); *B60K 17/10* (2013.01); *F04B 1/0408* (2013.01); *B60K 2007/0038* (2013.01); *B60K 2007/0092* (2013.01)

(58) Field of Classification Search
CPC ................ B60K 17/00; B60K 17/14; B60K 2007/0038; B60K 2007/0092; B60K 7/0015
See application file for complete search history.

(56) References Cited

U.S. PATENT DOCUMENTS

| | | | | |
|---|---|---|---|---|
| 2,736,516 A | * | 2/1956 | Wolf ....................... | B64C 25/50 244/50 |
| 2,811,140 A | * | 10/1957 | Nubling ................. | B60K 17/10 418/102 |
| 3,283,612 A | * | 11/1966 | Densham ................ | F16H 47/04 475/76 |
| 3,749,195 A | * | 7/1973 | Vegners ............... | B60K 7/0015 180/308 |
| 3,808,949 A | * | 5/1974 | Muncke ............... | B60K 7/0015 417/223 |
| 3,865,207 A | * | 2/1975 | Schwab ............... | B60K 17/356 180/21 |
| 3,999,465 A | * | 12/1976 | Burnight ............... | F01B 1/0644 91/498 |
| 4,148,464 A | * | 4/1979 | Fog .......................... | B66D 1/08 242/390.5 |
| 4,508,010 A | * | 4/1985 | Bock ....................... | F03C 1/247 91/474 |
| 4,945,816 A | * | 8/1990 | Mestieri .................. | F01B 1/062 318/640 |

(Continued)

FOREIGN PATENT DOCUMENTS

FR 2359277 2/1978
FR 2853364 10/2004

*Primary Examiner* — Brodie Follman
(74) *Attorney, Agent, or Firm* — Stetina Brunda Garred and Brucker

(57) ABSTRACT

Hydraulic motor integrated in a vehicular wheel comprising a hub having a cylindrical symmetry supported by a articulated stub axle and defining a development axis of the hub and of the hydraulic motor, a motor body, rotatably integral with the articulated stub axle, having an annular shape and being equipped with radial pistons, a ring nut integral with a hub and wherein said radial pistons act, an hydraulic oil distributor, wherein the hydraulic oil distributor is housed in the hub.

12 Claims, 2 Drawing Sheets

(56) References Cited

U.S. PATENT DOCUMENTS

| | | | | |
|---|---|---|---|---|
| 6,135,259 A * | 10/2000 | Forster | | B60K 7/0015 180/307 |
| 6,302,233 B1 * | 10/2001 | Okamuro | | B62D 7/18 180/253 |
| 6,334,512 B1 * | 1/2002 | Forster | | B60K 7/0015 188/71.5 |
| 6,524,206 B2 * | 2/2003 | Tsunemi | | B60K 7/0015 475/83 |
| 6,582,339 B2 * | 6/2003 | Damm | | B60K 7/0015 180/372 |
| 6,598,694 B2 * | 7/2003 | Forster | | B60K 7/0015 180/305 |
| 6,688,417 B2 * | 2/2004 | Hansell | | B60K 7/0015 180/305 |
| 6,702,070 B2 * | 3/2004 | Smith | | B60K 7/0015 188/250 G |
| 7,225,720 B2 * | 6/2007 | Lampinen | | F03C 1/0425 91/473 |
| 7,431,124 B2 * | 10/2008 | White, Jr. | | F16H 39/42 180/305 |
| 8,051,940 B2 * | 11/2011 | Ziech | | B60K 7/0015 180/253 |
| 8,100,204 B2 * | 1/2012 | Dong | | B60K 7/0015 180/308 |
| 8,534,431 B2 * | 9/2013 | Feusse | | B60K 7/0007 188/170 |
| 8,863,885 B2 * | 10/2014 | Dagh | | B60K 7/0015 180/308 |
| 9,273,809 B2 * | 3/2016 | Abenstein | | B60K 17/14 |
| 2004/0194619 A1 * | 10/2004 | Lampinen | | F03C 1/0425 91/491 |
| 2009/0230649 A1 * | 9/2009 | Ziech | | B60K 7/0015 280/93.512 |
| 2009/0297084 A1 * | 12/2009 | Ziech | | F16C 33/6677 384/551 |
| 2012/0187747 A1 * | 7/2012 | Dagh | | B60K 7/0015 301/6.5 |
| 2015/0336454 A1 * | 11/2015 | Colacito | | B60K 7/0015 301/6.5 |

\* cited by examiner

HYDRAULIC MOTOR INTEGRATED IN A VEHICULAR WHEEL

CROSS REFERENCE TO RELATED APPLICATIONS

The present application claims priority to PCT International Application No. PCT/EP2014/051786 filed on Jan. 30, 2014, which application claims priority to European Patent Application No. 13153240.0 filed Jan. 30, 2013, the entirety of the disclosures of which are expressly incorporated herein by reference.

STATEMENT RE: FEDERALLY SPONSORED RESEARCH/DEVELOPMENT

Not Applicable.

APPLICATION FIELD OF THE INVENTION

The present invention refers to the field of hydraulic motors directly integrated in vehicular wheels and more precisely to a radial piston hydraulic motor.

DESCRIPTION OF THE PRIOR ART

Hydraulic motors are often used on earthworks machines. Recently, such motors have been used also in commercial vehicles, for assisting the thermal engine in particular conditions where a high pickup torque is required.

Radial hydraulic engines are characterized in that they have a plurality of pistons arranged and movable radially on a circular crown in order to press on a shaped profile which provokes its rotation. Such profile is made on the internal surface of a ring, a so called shaped ring, which is integral with the wheel.

Several hydraulic motors directly inserted in the wheel hub are known in the art. They are subject to several problems.

Firstly, the fixed part of the oil distributor that is necessary to actuate the radial pistons is usually mounted overhead of the end of the articulated stub axle, namely in a coaxial way with respect to the articulated stub axle. This implies that it projects from the hub profile and thus it is more subject to hit sidewalks and other objects.

Another problem is to confine the hydraulic oil in another portion of the hub.

According to the devices known in the art, the most external bearing, with respect to the free end of the articulated stub axle, placed between the articulated stub axle and the hub, is within the area of the hub that confines the hydraulic oil. Thus, such bearing, instead of working in lubricating grease or oil, has to work in the hydraulic oil, whose physical-chemical characteristics are clearly different from the lubricating grease or oil.

A further problems of the known schemes relates to the fact that distinct fixing means are provided to connect the hub to the articulated stub axle and to connect the hydraulic motor to the articulated stub axle.

SUMMARY OF THE INVENTION

Therefore the aim of the present invention is to overcome all the aforementioned drawbacks and to provide a hydraulic motor integrated in a vehicular wheel.

According to a first aspect of the present invention, the distributor has an annular form and is splined on the articulated stub axle so that it is within the hub. A first advantage consists in that the distributor is inside the hub, and it does not project from it.

According to a further aspect of the present invention, the fixed part of the distributor has an external lateral surface that is tapered towards the free end of the articulated stub axle and the movable part of the distributor has also an annular form with an internal lateral surface complementary to the external lateral surface of the respective fixed part, so that the movable part is splined to the fixed part of the distributor and not to the articulated stub axle. In other words, the movable part of the distributor is fully supported by the fixed part of the distributor.

This, advantageously, allows one to limit the axial encumbrance of the distributor. Moreover, it allows one to release on the fixed part of the distributor the axial forces induced on the mobile part of the distributor, thus avoiding having to support the distributor with cup bearings.

According to a further aspect of the present invention, the fixed part of the distributor splined to the articulated stub axle defines an annular housing for housing an annular gasket for confining the hydraulic oil.

According to a further aspect of the present invention, the connection of both the hub and the hydraulic motor to the articulated stub axle is made by means of a single shared connection, namely by means of a threaded ring nut on the free end of the stub axle.

According to a further aspect of the present invention, the adjustment of the position of the bearings placed between the hub and the articulated stub axle is made by a single connection means and preferably also by means of a beat interface between the fixed part of the distributor and the articulated stub axle.

An object of the present invention is a hydraulic motor integrated in a vehicular wheel.

A ground vehicle comprising the aforementioned hydraulic motor integrated in at least a vehicular wheel is also object of the present invention.

The claims are an integral part of the present description.

BRIEF DESCRIPTION OF THE FIGURES

The purposes and advantages of this invention will become more clear from the following detailed description of an embodiment thereof (and of its alternative embodiments) and from the drawings that are attached hereto that are merely illustrative and not limitative, in which.

In the figures the same reference numbers and letters identify the same elements or components.

DETAILED DESCRIPTION OF PREFERRED EMBODIMENTS OF THE INVENTION

Figure 1:
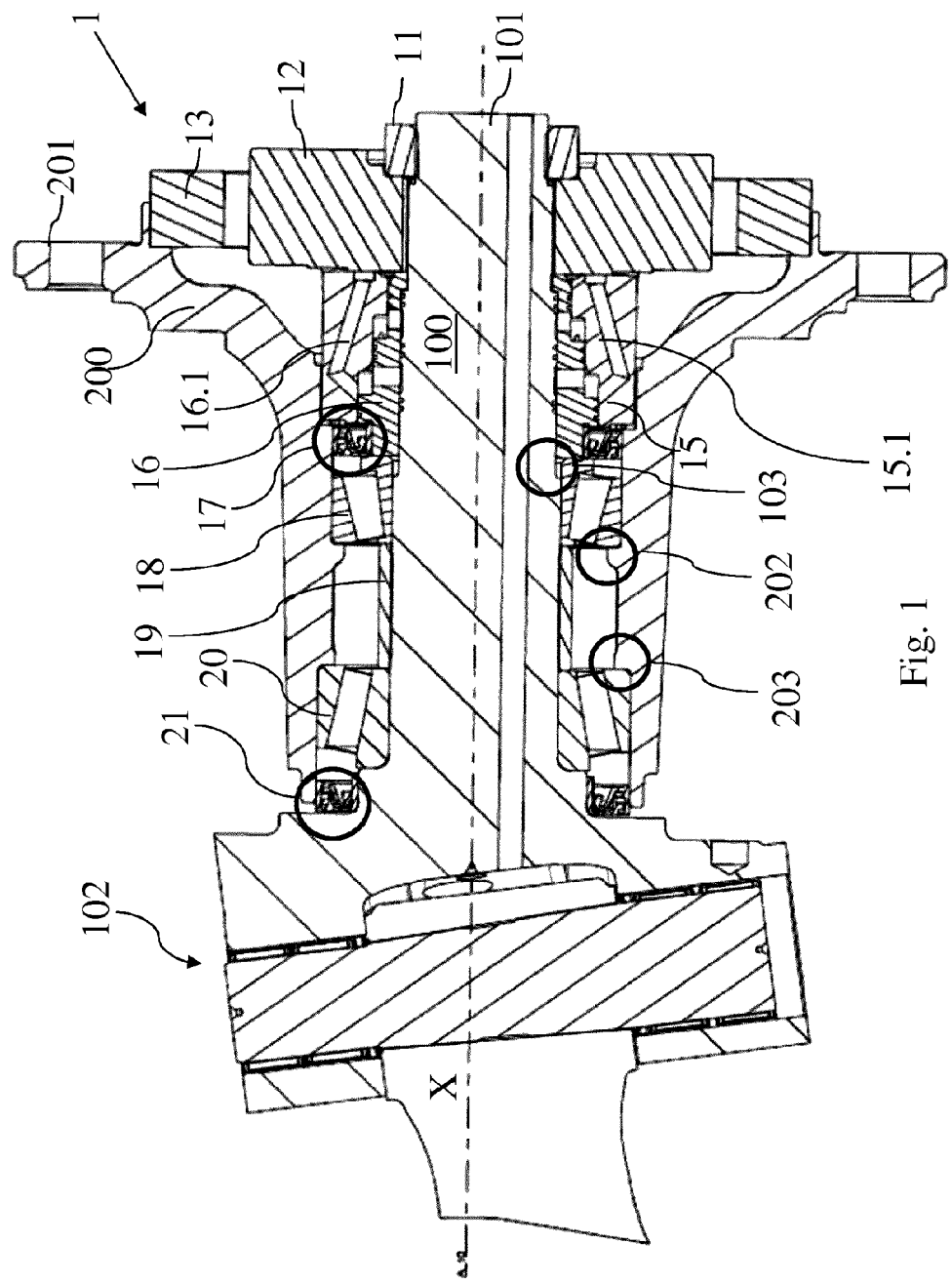
FIG. 1 shows an axial view with respect to the articulated stub axle of a preferred embodiment of the hydraulic motor according to the present invention.
Figure 2:
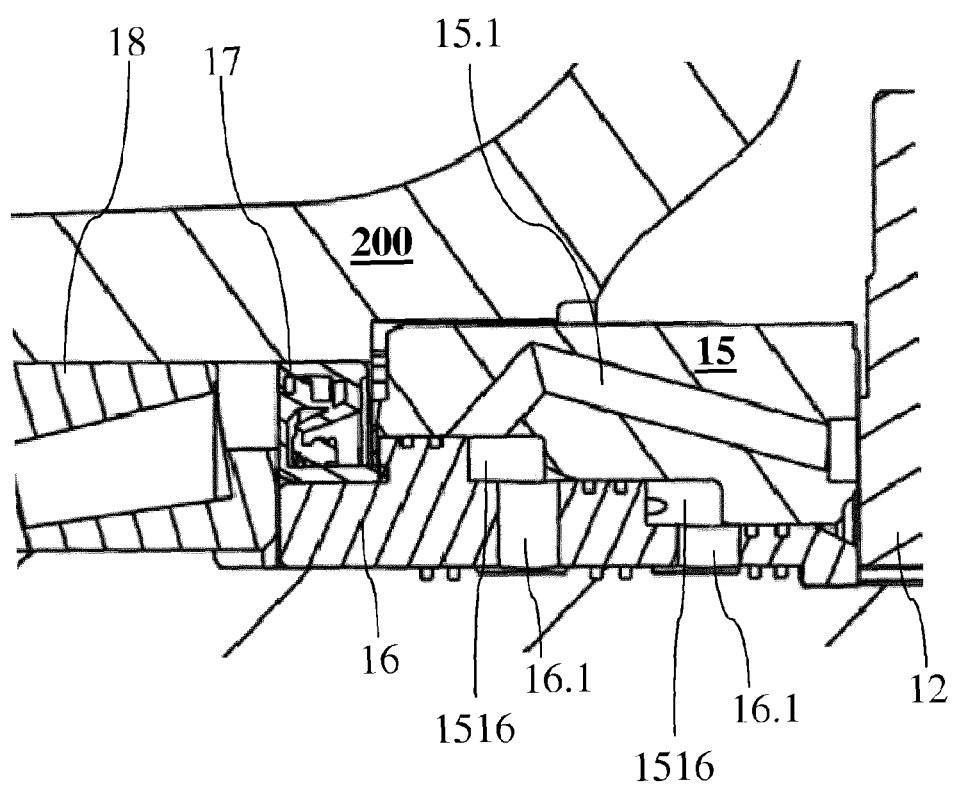
FIG. 2 shows an enlarged view of FIG. 1.

FIG. 1 shows a view according to an axial section with respect to the articulated stub axle 100 of the hydraulic motor 1 according to the present invention. The articulated stub axle, indeed, defines the development axis X of the hydraulic motor 1.

It is evident that most of the components of the motor are contained in the hub.

Although the free end 101 of the articulated stub axle 100 represents the most external part of the hydraulic motor 1, it is completely contained within the wheel, considering the stop surface 201 of the hub 200, to which the tire rim, not shown, is connected.

The hub's shape has a cylindrical symmetry. Preferably it has a cylindrical shape in the proximity of the articulation 102 of the articulated stub axle 100 and it tends to widen like a bell towards the free end 101, namely rightwards, looking at FIG. 1.

The motor body 12 is a torus integrating a plurality of radial pistons, not shown, acting on the shaped ring 13.

While the motor body is rotatably integral with the articulated stub axle 100, the shaped ring 13 is integral with the hub 200.

The hydraulic oil distributor comprises a rotatably fixed part 16 and a rotating part 15 with respect to the articulated stub axle. For more convenience, in the following discussion they will be referred to as fixed part and movable part, respectively.

Both the fixed and the movable parts can move axially.

The fixed part 16 has an annular shape with an external surface tapered towards the free end 101 of the articulated stub axle and is splined to the articulated stub axle. The movable part 15 of the distributor has an annular shape as well with a preferably cylindrical external surface and an internal surface complementary to the external surface of the fixed part. Thus the movable part 15 of the distributor fits on the fixed part 16. This is enough to determine, due to the passage of the hydraulic oil in the interface between the two parts, an axial thrust that spreads the two parts apart.

According to a further alternative embodiment of the present invention, the axial forces acting on the movable part of the distributor are balanced, since, during the passage of the hydraulic oil, reaction forces develop which tend to move the movable part away from the motor body 12. Opposite forces having equal or higher intensity are generated by the oil at the interface between the fixed and the movable part of the distributor, as shown above. Thus a sort of hydraulic bearing is generated between the fixed and movable part of the distributor. The fixed part of the distributor is splined to the slab axle, so that it can axially slide, thus it compresses the whole bearing pack (18, 19 and 20). This solution allows one to avoid providing a bearing suitable to support a rotating element, since the movable part 15 releases axial reaction forces on the fixed part 16 of the distributor, which is rotatably fixed.

According to a preferred embodiment of the invention, in order to increase the axial thrust spreading apart the fixed part 16 and the rotating part 15 of the distributor, chambers 1516 are provided on the interface between the two parts. In particular, such chambers having a preferably rectangular axial section, always ensure the oil passage in the pipes 15.1 and 16.1.

The surface of the chambers 1516 may be appropriately dimensioned in order to vary the aforementioned axial thrust.

The pipes 16.1 of the fixed part may be radial with respect to the axial symmetry of the motor. The pipes 15.1 made in the movable part of the distributor, collect oil from the pipes of the fixed part, to convey it, towards the right of the figure, to the motor body 12. Thus they have a first portion that is more markedly radial and a second portion that is more markedly axial.

The movable part 15 of the distributor is made rotatably integral with the shaped ring 13 and with the hub 200 by means of a spline or of a key between the body 15 and the hub.

The annular portion of the fixed part 16 of the distributor comprises a seat for housing an annular gasket fitted internally on the fixed part of the distributor and externally on the hub 200. Having the gasket in such position allows one to confine the portion of hub reached by the hydraulic oil, which, as it is known, is highly corrosive.

Moving towards the left of the drawing, between the hub 200 and the stub axle 100, a first bearing 18—also called external bearing—and a second bearing 20—also called internal bearing—and a further annular gasket 21 are housed in a sequence. All these elements fit internally on the articulated stub axle and externally on the hub.

The reciprocal position between the bearings is defined by a spacer 19, fitted on the articulated stub axle 100, and possibly by the stop teeth 202 and 203 made in the internal surface of the hub. Such stop teeth define the spacers between the bearings. This means that an axial inwards displacement, towards the left of the figure, of the external bearing 18 induces the same translation of the internal bearing 19 due to the reciprocal interference of the hub 200 and of the spacer 19 obtaining the desired pre-load.

The fixed part 16 of the distributor is directly in contact with the first bearing 18, and thus the aforementioned axial displacement of the first bearing can be determined by the interaction with the fixed part 16 of the distributor.

Analogously, since the distributor 15-16 is directly in contact with the motor body 12, an axial displacement of the distributor can be determined by the interaction with the motor body 12. A single ring nut 11, threading on the free end 101 of the articulated stub axle acting on the motor body 12, thus acts on the distributor 15-16, on the bearing 18, on the spacer 19 and hub 200, on the bearing 20.

It is evident that by virtue of the solution shown herein, a single connection element allows one not only to assembly the engine, but also to adjust the position of the bearings 18 and 20.

It is worth noting that the radial encumbrance is limited, since no further connection element is provided except the single ring nut 11.

It is also possible to notice that the fixed part 16 of the distributor can axially slide on the articulated stub axle. This means that it does not perform any stop function for the components at its left, namely the bearings and the respective spacer. Only the ring 11 performs this function. The parts that are rotatably fixed with respect to the articulated stub axle, such as for example, the motor body 12, or the fixed part 16 of the distributor, can be equipped with a splined profile or with other means blocking its rotation.

From the description set forth above it will be possible for the person skilled in the art to embody the invention with no need of describing further construction details. The elements and the characteristics described in the different preferred embodiments may be combined without departing from the scope of the present application.

The invention claimed is:

1. A hydraulic motor (1) integrated in a vehicular wheel comprising
   a hub (200) having a cylindrical symmetry supported by an articulated stub axle (100) and defining a development axis (X) of the hub and of the hydraulic motor,
   a motor body (12), rotatably integral with the articulated stub axle (100), having an annular shape,
   a shaped ring (13) integral with a hub (200) and on which the hydraulic motor acts,
   a hydraulic oil distributor (15-16),
   wherein the hydraulic oil distributor (15-16) is housed in the hub (100), wherein the hydraulic oil distributor has an overall annular shape and is splined to the articulated stub axle (100).

2. The hydraulic motor according to claim 1, wherein said hydraulic oil distributor comprises a first part (16), rotatably fixed with respect to the articulated stub axle (100), and a second part (15), rotatably movable with respect to the articulated stub axle (100), wherein said first part (16) has an annular shape with an external surface tapered towards a free end (101) of the articulated stub axle (100).

3. The hydraulic motor according to claim 2, wherein said second part (15) has an annular shape with an internal surface complementary to the external surface of said first part, so that it is splined to said first part (16).

4. The hydraulic motor according to claim 3, wherein first hydraulic oil pipes (16.1) have a radial development and are in the first part of the distributor (16) and wherein second hydraulic oil pipes (15.1) are in the second part of the distributor (15) with at least a portion having an axial development.

5. The hydraulic motor according to claim 4, wherein thrust chambers (1516) are defined in correspondence of the complementary surfaces of the first and second parts (15, 16) of the hydraulic oil distributor (15-16).

6. The hydraulic motor according to claim 1, further comprising a first bearing (18) and a second bearing (20) placed between the articulated stub axle (100) and the hub (200), the first and second bearings being spaced between each other by means of a spacers (19, 202, 203), wherein said first bearing (18) is directly in contact with said hydraulic oil distributor (15-16), so that an axial displacement of the hydraulic oil distributor causes an axial displacement of the bearings (18, 20).

7. The hydraulic motor according to claim 6, wherein said first bearing (18) is directly in contact with said first part (15, 16) of the hydraulic oil distributor (15-16).

8. The hydraulic motor according to claim 6, further comprising a single ring nut (11) threading on a free end (101) of the articulated stub axle (100) blocking in a sequence blocked components including: the motor body (12), the hydraulic oil distributor (15-16), the first bearing (18), the spacer (19), the second bearing (20), so that said single ring nut allows both to assemble the engine and to adjust the position of said blocked components.

9. The hydraulic motor according to claim 1, wherein said hydraulic oil distributor (15-16) defines a seat for an annular gasket (17) confining hydraulic oil.

10. The hydraulic motor according to claim 9, wherein said seat is defined by the first part (16) of the distributor, rotatably fixed with respect to the articulated stub axle (100).

11. The hydraulic motor according to claim 5, wherein said articulated stub axle comprises at least a stop surface (103) for limiting the axial sliding of one of the motor body, the first part, the second part (11, 12, 15-16) splined to it.

12. A ground vehicle having a wheel wherein a hydraulic motor according to claim 1 is housed.

\* \* \* \* \*